US008833843B2

(12) United States Patent
Stark et al.

(10) Patent No.: US 8,833,843 B2
(45) Date of Patent: Sep. 16, 2014

(54) SUNROOF UNIT AND VEHICLE WITH A SUNROOF UNIT

(75) Inventors: Wolfgang Stark, Ostfildern (DE); Guenther Renz, Ditzingen (DE); Gwenole Zeo, Ostfildern (DE); Sascha Kircher, Albershausen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 13/587,434

(22) Filed: Aug. 16, 2012

(65) Prior Publication Data
US 2013/0049409 A1  Feb. 28, 2013

(30) Foreign Application Priority Data
Aug. 22, 2011  (DE) .......................... 10 2011 081 348

(51) Int. Cl.
B60J 3/02 (2006.01)
B60J 7/043 (2006.01)
B60J 7/02 (2006.01)
B60J 7/00 (2006.01)

(52) U.S. Cl.
CPC ................ B60J 7/0015 (2013.01); B60J 7/022 (2013.01)
USPC ................... 296/214; 296/216.08; 160/273.1; 160/370.22; 160/372

(58) Field of Classification Search
USPC .......... 296/214, 215, 216.08, 100.12, 100.17; 160/31, 268.1, 269, 270, 271, 273.1, 160/370.22, 372
See application file for complete search history.

(56) References Cited

U.S. PATENT DOCUMENTS

| 6,899,380 | B2 * | 5/2005 | Kralik et al. ................... 296/214 |
| 6,971,704 | B2 | 12/2005 | Cocaign |
| 7,387,329 | B2 * | 6/2008 | Mollick et al. ............... 296/97.8 |
| 7,441,833 | B1 * | 10/2008 | Pomeroy et al. ......... 296/216.06 |
| 7,695,057 | B2 * | 4/2010 | Autterson ..................... 296/214 |
| 7,909,393 | B2 * | 3/2011 | Autterson ..................... 296/214 |

(Continued)

FOREIGN PATENT DOCUMENTS

| DE | 195 38 551 C1 | 10/1996 |
| DE | 103 31 143 A1 | 2/2005 |

(Continued)

OTHER PUBLICATIONS

European Patent Office Examination Report issued in European Application No. 12 18 0588 with English translation of category of cited documents, dated May 22, 2014 (8 pages).

*Primary Examiner* — Dennis H Pedder
(74) *Attorney, Agent, or Firm* — Flynn, Thiel, Boutell & Tanis, P.C.

(57) ABSTRACT

A sunroof unit for a motor vehicle having a vehicle window arranged in the vehicle roof area and having at least one roller blind system below the vehicle window for partially covering the vehicle window, wherein the roller blind system has two guide rails aligned in the vehicle longitudinal direction and a flexible planar structure guided in lateral areas by the guide rails. The guide rails are fixed with regard to their distance from one another in a front end area and/or in a rear end area only indirectly by the vehicle window. The guide rails are each fastened using a fixing device to the vehicle window, and at least one fixing device is designed as a variable fixing device to permit a positive fixing of the respective guide rail relative to the vehicle window in one of several discrete relative positions with respect to a vehicle transverse direction.

23 Claims, 2 Drawing Sheets

(56) References Cited

U.S. PATENT DOCUMENTS

| | | |
|---|---|---|
| 2004/0075304 A1* | 4/2004 | Cocaign .................. 296/214 |
| 2005/0046242 A1 | 3/2005 | De Gaillard et al. |
| 2011/0204682 A1 | 8/2011 | Kamei et al. |
| 2012/0003034 A1 | 1/2012 | Inaba et al. |

FOREIGN PATENT DOCUMENTS

| | | |
|---|---|---|
| DE | 20 2004 018 915 U1 | 3/2005 |
| DE | 20 2007 007 067 U1 | 9/2007 |
| DE | 10 2011 007 620 A1 | 10/2012 |
| EP | 1 375 306 A1 | 1/2004 |
| EP | 2 327 576 A1 | 6/2011 |
| WO | WO 2010/125837 A1 | 11/2010 |

* cited by examiner

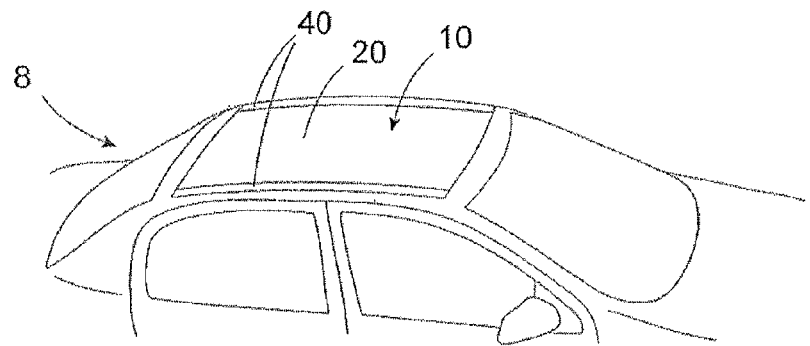
Fig. 1
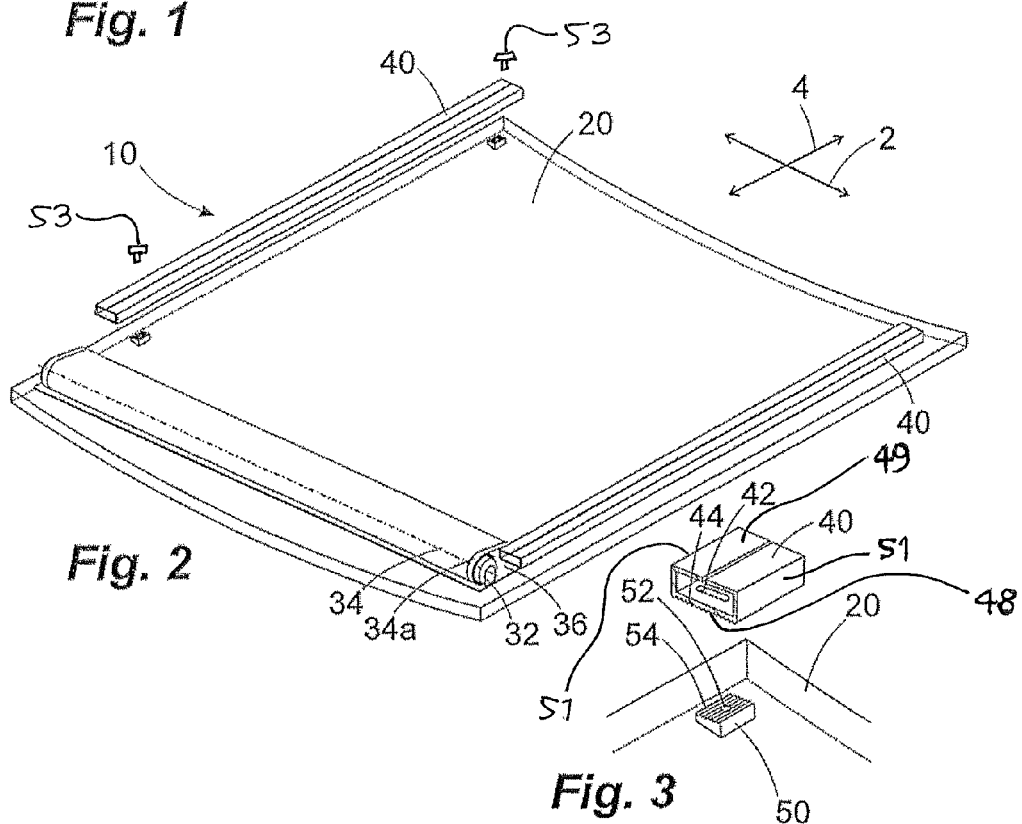
Fig. 2
Fig. 3
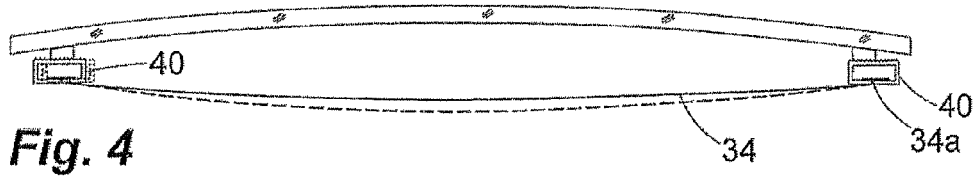
Fig. 4

SUNROOF UNIT AND VEHICLE WITH A SUNROOF UNIT

FIELD OF THE INVENTION

The invention relates to a sunroof unit for a motor vehicle having a vehicle window for approximately horizontal arrangement in the roof area of the vehicle and having at least one roller blind system arranged below the vehicle window for at least partial covering of the vehicle window, where the roller blind system has two guide rails aligned in the vehicle longitudinal direction and a flexible planar structure guided in lateral areas by the guide rails. The invention relates furthermore to a vehicle having a sunroof unit of this type.

BACKGROUND OF THE INVENTION

Generic sunroof units are generally known from the prior art. Vehicles with a large glass roof can have sunroof units of this type and thus have, in addition to the usually quite large window arranged in the roof, a roller blind system which can at least partially cover this window for the purpose of providing shade for the vehicle interior.

From the prior art, designs are known in which both the vehicle window and the roller blind system, in particular its guide rails, are fitted independent of one another in the roof area of a vehicle, for example on a common module frame. it is however also known at least from internal prior art how to attach direct to the window a guide rail frame consisting of two longitudinally extending guide rails and two transversely extending cross-members connecting the guide rails to one another at the front and rear, such that the window with the roller blind system attached to it can be installed in a vehicle as a single easy to handle structural unit.

This direct attachment of the guide rails as part of a closed frame to the vehicle window is in many cases not ideal, since the cross-members connecting the guide rails are felt to be a disadvantage from an aesthetic viewpoint. This is particularly so when the guide rails do not extend over the entire length of the window, but only over a part of the window, for example due to the use of several roller blind systems or for any other reason. In a case like this, the cross-members connecting the guide rails at the rear or front end would impair the intended unrestricted view through the sunroof to an unacceptable degree.

The maintenance of a defined distance between the two guide rails of a roller blind system, assured by the said cross-members in particular, is necessary since the flexible planar structures used in the stated application and whose lateral edge is guided by the guide rails, have to sag to a defined degree. It is therefore not acceptable when the distance between the guide rails decreases over the service life of a motor vehicle, as this increases the sag. The attachment of the guide rails to the vehicle window in a precisely defined way and not individualized for any single sunroof unit does permit the achievement of a precisely defined and constant distance, but it has proved that lack of constancy in the material properties of the planar structure make it necessary to provide, individually for each sunroof unit, a specific distance between the guide rails.

SUMMARY OF THE INVENTION

The object of the invention is therefore to further develop a generic sunroof unit such that a specifically adjusted distance between the guide rails can be achieved that does not undergo any change over the service life of the vehicle.

In accordance with the invention, this is achieved in that the guide rails are fixed with regard to their distance from one another in a front end area and/or in a rear end area only indirectly by the vehicle window, that furthermore the guide rails in this front end area and/or rear end area are each fastened using a fixing device to the vehicle window, and that at least one of these fixing devices of one of the guide rails is designed as a variable fixing device such that it permits a positive fixing of this guide rail relative to the vehicle window in one of several discrete relative positions in respect of a vehicle transverse direction.

In the meaning of the present invention, the directions given for the vehicle longitudinal direction, vehicle transverse direction and vehicle vertical direction must be understood with reference to the preferred installation position relative to the sunroof unit. The basic engineering principle of the invention can of course also be applied to different alignments.

The design in accordance with the invention is characterized in that the guide rails are fixed relative to one another only by the vehicle window in a front and/or rear end area or over their entire length, where this must be understood to mean that at least in a front partial area or a rear partial area each taking up at least 40% of the entire length of the guide rails, there is no indirect fixing and distance-fixing of the guide rails to one another by a connecting transverse cross member or the like. Instead, the distance between the guide rails is assured in the area in question in that both guide rails are connected to the vehicle window. For the purpose of this connection, the fixing devices mentioned are provided in the respective end area and permit, for example, bolting of the guide rail to the vehicle window or to a fastening section fastened to the vehicle window. At least one of these fixing devices permits, as a variable fixing device, fastening of the respective guide rail in one of several provided positions relative to the vehicle window. This variable fixing device thus allows the guide rail fastened by it to the vehicle window also to be fastened relative to the other guide rail in one of several positions. It is thus possible to bring about a position of this variably fastenable guide rail adapted to the specifically used planar structure and hence to achieve the required sag of the planar structure. The variable fixing device is designed here for making a positive connection, which prevents a gradual change in the distance between the guide rails and hence in the sag of the planar structure over the service life of a motor vehicle with a sunroof unit in accordance with the invention. This gradual change would be a problem if the distance between the guide rails were to be assured by means of a friction-based fixing device.

A particularly simple but not preferred design of a variable fixing device can for example be achieved in that several holes usable alternatively to one another are provided in the guide rail for bolting of the guide rail to the window or to a fastening section connected to it. Such holes usable alternatively to one another could also be provided on the respective fastening section. A solution of this type leads however to a fairly large distance in the vehicle transverse direction of the several discrete relative positions.

In contrast, a variable fixing device having a fastening section attached to the vehicle window and to which the guide rail can be fastened is advantageous, where the fastening section and the guide rail have profiles facing one another which can be engaged with one another in several different positions relative to the vehicle transverse direction. With a design of this type, profiles of the fixing device on the guide rail side and on the fastening section side engage with one another, and the required permanent positive connection is achieved in that, by means of additional fasteners such as bolts or catches, the profiles on the guide rail and the fastening section are fixed to one another such that the profiles can no longer be disengaged from one another. The fastening sections preferably made of plastic can be integrally moulded or glued to the window in a defined arrangement not specific for each sunroof unit but identical for all sunroof units of the same type.

A particularly simple and preferred shape of the profiles is formed by toothing provided on the fastening section and/or on the guide rail. The teeth of this toothing extend here preferably parallel to the vehicle longitudinal direction, so that during assembly the teeth can initially be engaged with one another to achieve the correct distance from the other guide rail, in order to then permit a displacement of the guide rails in the vehicle transverse direction. There are preferably at least three teeth at a distance from one another in the vehicle transverse direction on the fastening section and/or on the guide rail. The tooth spacing is preferably less than 2 mm, in particular preferably less than 1.5 mm.

The profile on the guide rail side preferably extends approximately (>80%) over the entire length of the guide rail. This allows the guide rail to be manufactured as a plastic or metal profile in a continuous process.

The guide rails can in one design be indirectly connected to one another exclusively by the vehicle window. With a design of this type, the distance of the guide rails to one another is not guaranteed over their entire length by a cross-member directly connecting the guide rails, but depends over the entire length, and hence both in the front and in the rear end area of the guide rails, exclusively on the relative position in which guide rails are fastened on the glass sheet.

An alternative design to this provides that the guide rails are connected to one another either at the front or the rear end by means of a cross-member, where this cross-member is preferably also used as the carrier of a winding shaft rotatably mounted thereon for receiving the planar structure. If this cross-member is firmly connected to both guide rails, in the end area the distance of the guide rails from one another is determined by the respective attachment of the guide rails to the cross-member. In such a case, preferably only the opposite end areas of the guide rail are defined in terms of their distance from one another by the variable fixing device.

Particularly advantageous is a sunroof unit in accordance with the invention, where it is provided that two roller blind systems of the type described are provided for at least partial covering of the vehicle window, where the roller blind systems each have two guide rails aligned in the vehicle longitudinal direction and in each case a flexible planar structure guided in lateral areas by the respective guide rails, and where the two roller blind systems in the vehicle longitudinal direction are fastened one behind the other to the vehicle window. It is preferably provided here that at least the guide rails of the front roller blind in a rear end area are fixed in respect of their distance from one another not by a cross-member, but only indirectly by the vehicle window, and at least the guide rails of the rear roller blind in a front end area are fixed in respect of their distance from one another not by a cross-member, but only indirectly by the vehicle window.

A design of this type is intended to provide two roller blind systems separate from one another as a part of a sunroof unit and to attach each of them to the vehicle window, where the one roller blind system permits a partial covering of the vehicle window from the front and the other roller blind system a partial covering of the vehicle window from the rear. If one of these roller blind systems or both roller blind systems have a transverse cross member, to which for example the respective winding shaft is rotatably attached, these transverse cross members must each be provided at that end of a roller blind system facing away from the other roller blind system, so that those end areas of both roller blind systems facing one another are free of these cross-members, in order not to impair the view through the window in the vehicle roof. The fixing in accordance with the invention of at least one end area of the respective guide rails to the vehicle window by means of a variable fixing device permits the specifically adapted distance between the facing end areas of the respective guide rails to be achieved independently of one another, so that for achieving a consistent sag of the respective planar structure the distances of the guide rails from one another at the front roller blind system and at the rear roller blind system can differ from one another.

The invention furthermore also relates to a vehicle having a sunroof unit, where the latter is designed in the manner described above.

BRIEF DESCRIPTION OF THE DRAWINGS

Further advantages and aspects of the invention emerge from the claims and from two preferred embodiments explained on the basis of the figures.

FIG. 1 shows a vehicle having a sunroof unit in accordance with the invention for illustration of the installation position, FIG. 2 shows a first embodiment of a sunroof unit in accordance with the invention in an overall view, FIG. 3 shows in an enlarged view a variable fixing device for fixing of one of the two guide rails of the sunroof unit according to FIG. 2, FIG. 4 shows the sunroof unit of FIG. 2 in a perspective view looking in the vehicle longitudinal direction.

DETAILED DESCRIPTION

Figure 5:
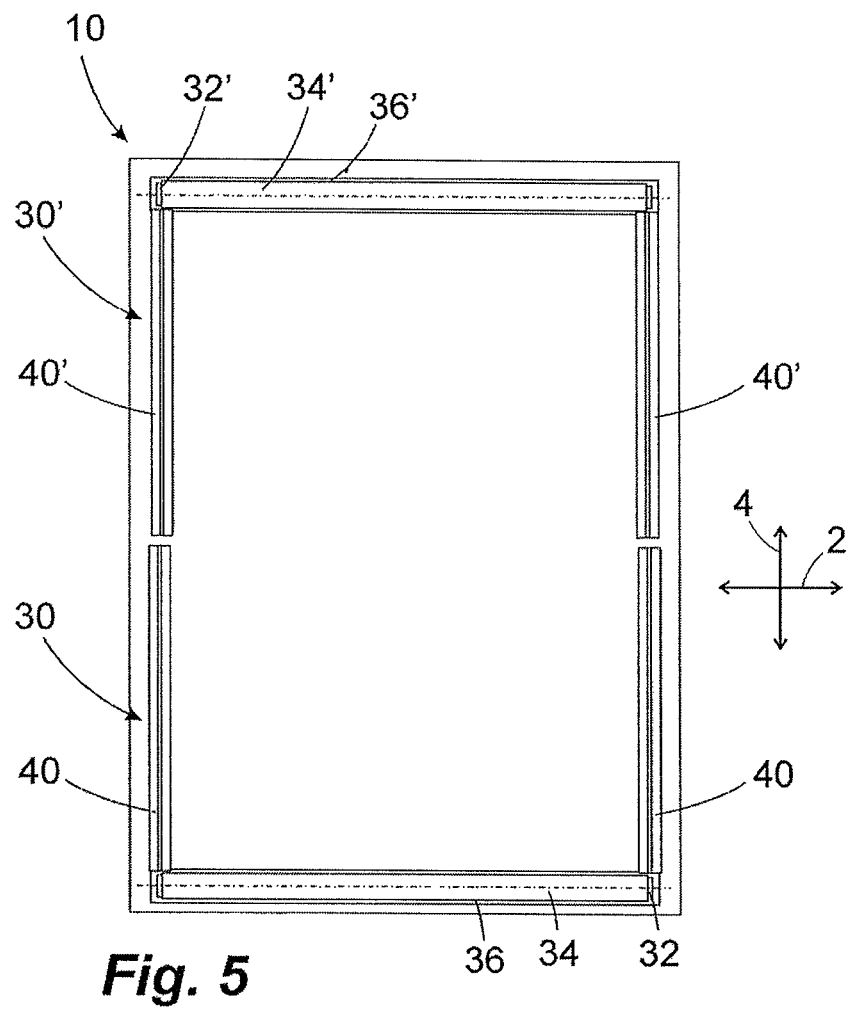
FIG. 5 shows in a schematic form an alternative embodiment of a sunroof unit in accordance with the invention.

FIG. 1 shows a vehicle 8 having a sunroof unit in accordance with the invention 10. This sunroof unit 10 is provided in a recess in the roof of the vehicle 2 and comprises a window 20 covering the recess and a roller blind system 30 with two guide rails 40 arranged underneath.

FIG. 2 shows an overall view of this sunroof unit in accordance with the invention 10 from below. This has the already mentioned window 20, which is comparatively large (at least 80 cm×80 cm) and which is provided for attachment as illustrated in the roof area of the vehicle. In the perspective view in FIG. 2, the direction of viewing is from obliquely below onto this window 20. The sunroof unit 10 has underneath the window 20 a manually operated and hence drive motor-free roller blind system 30, which has as main components a rotatably mounted winding shaft 32 with the planar structure 34 wound onto it and unwindable against the force of a winding spring, and the mentioned guide rails 40 for displaceable mounting of Teflon strips 34a provided on the edge of the planar structure 34. The winding shaft 32 is provided rotatably on a roller blind shaft support 36 fastened in a manner not shown in detail to the window 20. The guide rails 40 are likewise fastened to the window 20, where in the illustration in FIG. 2 the left-hand guide rail is lifted to make clear the nature of the fastening.

As can be seen in enlarged form in FIG. 3, the guide rails 40 are fastened to the window 20 using fastening sections 50 which are glued from underneath or integrally moulded to the window. The guide rails 40 have upper and lower walls 48 and 49, and sidewalls 51 which interconnect the upper and lower walls 48 and 49. The fastening sections 50 have a fixing hole 52 designed in a manner not shown in detail with a thread. Corresponding to this, the guide rails 40 are designed with slots 42 which, by use of the fixing holes 52 permit bolting of the guide rails 40 to the window 20 in a variable position relative to the vehicle transverse direction 2 via respective fastening bolts 53. However, there is no infinitely adjustable relative position of the guide rails 40 to the window 20 here. Instead it is provided, in order to achieve the most stable connection possible in respect of an unchanging distance of the guide rails 40 from one another, that profiles 54, 44 facing one another are provided on the fastening section 50 and on the guide rails 40. These profiles are teeth extending in the vehicle longitudinal direction 4 of a toothing, where the latter extends in the case of the guide rails 40 over their entire length.

The toothings 44, 54 permit in the manner clearly shown in FIG. 4 a fixing of the guide rails 40 only in defined and set positions on the fastening sections 50. This restricts the flexibility in respect of the distance of the guide rails 40 from one another, however in connection with the fastening bolt 53 protruding through the slot 42 into the fixing hole 52 and hence preventing any separation of the fastening sections from the guide rails 40, a positive fixing of the guide rails relative to the vehicle transverse direction 2 is achieved which ensures even over the entire service life of a vehicle a permanently unchanging distance of the guide rails 40 from one another.

FIG. 4 makes clear how the distance of the guide rails 40 from one another can be influenced by the sag of the planar structure 34. It can be discerned that the planar structure 34 engages by means of its Teflon strips 34a in the guide rails 40, so that the lateral edges of the planar structure 34 are moved in guided manner along the guide rails 40. Due to the movement, taking place during assembly, of the left-hand guide rail 40 out of the position shown as a dashed line into the position shown by the solid line, a reduction in the sag of the planar structure 34 is achieved.

FIG. 5 shows in a schematic form an alternative design. This matches in its design the embodiment of FIGS. 2 to 4 with one exception. The particular feature in the design of the embodiment in FIG. 5 is that two roller blind systems 30, 30' are provided which each have two guide rails 40, 40'. The respective winding shafts 32, 32' are provided at opposite ends of the roller blind systems and hence in the front and rear edge areas of the window 20. The respective planar structures 34, 34' can thus be moved towards one another in order to cover the window 20 almost completely and hence to provide almost complete shade for the vehicle interior.

Although it is also possible with a design of this type to provide common guide rails instead of separate guide rails 40, 40' for each of the roller blind systems 30, 30', the distance between which could then be set using the transverse cross members 36, 36', this would however harbour the risk that the respective planar structures 32, 32' in the unwound state sag to a differing degree. To prevent this, guide rails 40, 40' for each of the roller blind system and at a specific distance are provided which in the case of the embodiment shown in FIG. 4 to illustrate the advantage, are fitted at a slightly different distance to one another on the vehicle window 20, in order to thereby achieve a consistent sag.

The attachment of these guide rails 40, 40' or at least of the respective ends of these guide rails 40, 40', which are facing one another, to the window 20 is achieved with the fastening sections 50 already described for FIGS. 2 to 4.

The invention claimed is:

1. A sunroof unit for a motor vehicle, comprising:
a vehicle window for approximately horizontal arrangement in a roof area of a vehicle; and
at least one roller blind system arranged below the vehicle window for at least partially covering the vehicle window, the roller blind system having two guide rails and a flexible planar structure guided in lateral areas thereof by the respective guide rails, the guide rails being fixed with regard to their distance from one another in a front end area and/or in a rear end area only indirectly by the vehicle window, the guide rails in the front end area and/or the rear end area each being fastened to the vehicle window by a fixing device, the fixing device of one of the guide rails comprising a variable fixing device which positively fixes the one guide rail relative to the vehicle window in one of several discrete and predetermined relative positions with respect to a direction transverse to the respective guide rails, the variable fixing device having a fastening section attached to the vehicle window and to which the one guide rail is fastened, the fastening section and the one guide rail having respective profiles with respective complementary-shaped surfaces which face one another and which are positively engaged with one another in one of several discrete and predetermined relative positions to maintain a fixed distance between the respective guide rails in a direction transverse thereto over the life of the sunroof unit, the surfaces of the profiles allowing adjustment of the distance between the respective guide rails in a direction transverse to the respective guide rails;
wherein the profile and the respective surface thereof of the fastening section are non-movable relative to the fastening section and the profile and the respective surface thereof of the one guide rail are non-movable relative to the one guide rail.

2. The sunroof unit of claim 1, wherein the surface of the profile of the one guide rail extends along substantially the entire length of the one guide rail.

3. The sunroof unit of claim 1, wherein the respective surfaces of the profiles are configured as toothings.

4. The sunroof unit of claim 1, further including a cross-member extending transversely between the respective guide rails to interconnect same, the cross-member being disposed at the front end area or the rear end area.

5. The sunroof unit of claim 4, further including a winding shaft rotatably mounted on the cross-member, the planar structure being windable onto, and unwindable from, the winding shaft member.

6. The sunroof unit of claim 1, wherein the guide rails are connected to one another solely by the vehicle window in that the sunroof unit includes no cross-member transversely interconnecting the guide rails to one another adjacent the variable fixing device.

7. The sunroof unit of claim 1, wherein the fastening section is disposed vertically between the vehicle window and the one guide rail such that the one guide rail is indirectly fixed to the vehicle window by the fastening section.

8. The sunroof unit of claim 7, wherein the profile of the one guide rail is disposed on an upper portion of the one guide rail and the profile of the fastening section is disposed on a lower portion of the fastening section.

9. The sunroof unit of claim 8, wherein the upper portion of the one guide rail defines therein a slot which is elongated in a direction transverse to the respective guide rails and through which a fastener extends and engages within an opening defined in the fastening section.

10. The sunroof unit of claim 9, wherein the one guide rail has vertically-spaced upper and lower walls interconnected to one another by respective generally upright and laterally-spaced sidewalls oriented transversely to the upper and lower walls, the upper wall including the upper portion and the slot, the lower wall receiving one of the lateral areas of the flexible planar structure.

11. The sunroof unit of claim 10, wherein the profiles each comprise a plurality of alternating grooves and projections which are elongated in a longitudinal direction of the respective guide rails and transversely to the slot defined in the one guide rail.

12. The sunroof unit of claim 1, wherein the at least one roller blind system is a first roller blind system and the sunroof unit includes a second roller blind system, the first and second roller blind systems being arranged below the vehicle window for at least partially covering the vehicle window, the second roller blind system having two guide rails and a flexible planar structure guided in lateral areas thereof by the respective guide rails of the second roller blind system, the first and second roller blind systems being fastened to the vehicle window one behind the other in a direction substantially parallel to the respective guide rails.

13. The sunroof unit of claim 12, wherein the first roller blind system is located adjacent a front of the vehicle window and the second roller blind system is located adjacent a rear of the vehicle window, the guide rails of the first roller blind system being fixed with regard to their distance from one another in the rear end area thereof only indirectly by the vehicle window, and the guide rails of the second roller blind system being fixed with regard to their distance from one another in a front end area thereof only indirectly by the vehicle window.

14. A sunroof unit for a motor vehicle comprising:
a window for approximately horizontal arrangement in a roof area of a vehicle, the window having a pair of laterally spaced edge portions;
a roller blind system disposed vertically below the window for partially covering the window, the roller blind system comprising:
a pair of guide rails laterally spaced from one another adjacent the respective edge portions of the window;
a flexible and substantially planar structure extending transversely between the guide rails and having laterally spaced edge portions engaged with the respective guide rails for movement relative thereto in a direction substantially parallel to the respective guide rails; and
a pair of fixing devices each fastening one of the guide rails to the window, one of the fixing devices including a fastening section fixed to a lower surface of the window and having a first profile, the guide rail corresponding to the one fixing device having a second profile disposed to face the first profile and being engaged with the first profile, the first and second profiles each including alternating grooves and projections, the grooves and projections of the first profile being shaped in a complementary manner with respect to the grooves and projections of the second profile, the projections comprising elongated solid structures which extend continuously along a substantial portion of the first profile in a direction substantially parallel to the respective guide rails, the grooves and projections of the first and second profiles together defining a plurality of discrete positions for the guide rail relative to the fastening section in a direction transverse to the respective guide rails, the projections of the first profile matingly engaging with the grooves of the second profile in one of the plurality of discrete positions to maintain a fixed distance between the respective guide rails in a direction transverse to the respective guide rails over the life of the sunroof unit.

15. The sunroof unit of claim 14, wherein the guide rail corresponding to the one fixing device is connected to the one fixing device by the engagement of the first and second profiles, and the guide rail corresponding to the one fixing device is additionally connected to the one fixing device by a threaded fastener.

16. The sunroof unit of claim 15, wherein the second profile is disposed on an upper portion of the respective guide rail and the one fixing device is disposed vertically between the window and the corresponding guide rail, the upper portion defining therein a slot which is elongated in a direction transverse to the respective guide rails and through which the fastener extends and engages with the one fixing device.

17. The sunroof unit of claim 16, wherein the grooves and projections are elongated in a direction substantially parallel to the respective guide rails and transversely to the slot.

18. The sunroof unit of claim 14, wherein the grooves and projections are selectively engaged with one another to place the respective guide rail in one of the plurality of discrete and predetermined positions.

19. The sunroof unit of claim 16, wherein the guide rail corresponding to the one fixing device has vertically-spaced upper and lower walls interconnected to one another by respective generally upright and laterally-spaced sidewalls oriented transversely to the upper and lower walls, the upper wall including the upper portion and the slot, the lower wall receiving one of the lateral areas of the flexible planar structure.

20. The sunroof unit of claim 14, wherein the projections of the fastening section are rigid and non-movable relative to the fastening section.

21. A sunroof unit for a motor vehicle, comprising:
a vehicle window for approximately horizontal arrangement in a roof area of a vehicle; and
at least one roller blind system arranged below the vehicle window for at least partially covering the vehicle window, the roller blind system having two guide rails and a flexible planar structure guided in lateral areas thereof by the respective guide rails, the guide rails being fixed with regard to their distance from one another in a front end area and/or in a rear end area only indirectly by the vehicle window, the guide rails in the front end area and/or the rear end area each being fastened to the vehicle window by a fixing device, the fixing device of one of the guide rails comprising a variable fixing device which positively fixes the one guide rail relative to the vehicle window in one of several discrete and predetermined relative positions with respect to a direction transverse to the respective guide rails, the variable fixing device having a fastening section attached to the vehicle window and to which the one guide rail is fastened, the fastening section and the one guide rail having respective profiles with respective complementary-shaped surfaces which face one another and which are positively engaged with one another in one of several discrete and predetermined relative positions to maintain a fixed distance between the respective guide rails in a direction transverse thereto over the life of the sunroof unit, the surfaces of the profiles allowing adjustment of the distance between the respective guide rails in a direction transverse to the respective guide rails;

wherein the profile and the respective surface thereof of the fastening section are rigid and non-movable relative to the fastening section and the profile and the respective surface thereof of the one guide rail are non-movable relative to the one guide rail.

22. A sunroof unit for a motor vehicle comprising:

a window having a pair of side edge portions spaced laterally from one another and front and rear edge portions spaced from one another and oriented transversely with respect to the side edge portions; and a roller blind system disposed below the window for partially covering the window, the roller blind system including:

a pair of elongated guide rails spaced laterally from one another adjacent the respective side edge portions of the window;

a flexible and substantially planar structure extending transversely between the guide rails and having laterally spaced edge portions engaged with the respective guide rails for movement relative thereto in a direction substantially parallel to the guide rails; and a fastening element interposed between one of the guide rails and a lower surface of the window, the fastening element having a first profile, the first profile being disposed to face the one guide rail and being rigid and non-movable relative to the fastening element, the one guide rail having a second profile engaged with the first profile, the second profile being rigid and non-movable relative to the one guide rail, the first and second profiles being shaped in a complementary manner with respect to one another and together defining a plurality of predefined positions for the one guide rail relative to the fastening element and the other guide rail in a direction transverse to a longitudinal extent of the respective guide rails, the first and second profiles being selectively engageable with one another to allow placement of the one guide rail in a selected one of the plurality of predefined positions to maintain a fixed and predefined distance transversely between the respective guide rails over the life of the sunroof unit.

23. The sunroof unit of claim 22, wherein the one guide rail is fixed to the fastening element by a fastener and the fastener is disposed to prevent disengagement of the first and second profiles from one another after engagement of the first and second profiles in the selected one of the plurality of predefined positions.

* * * * *